US006670212B2

(12) United States Patent
McNie et al.

(10) Patent No.: US 6,670,212 B2
(45) Date of Patent: Dec. 30, 2003

(54) MICRO-MACHINING

(75) Inventors: Mark E. McNie, Worcestershire (GB); Vishal Nayar, Worcestershire (GB)

(73) Assignee: Qinetiq Limited, London (GB)

( * ) Notice: Subject to any disclaimer, the term of this patent is extended or adjusted under 35 U.S.C. 154(b) by 45 days.

(21) Appl. No.: 09/898,081

(22) Filed: Jul. 5, 2001

(65) Prior Publication Data

US 2002/0017132 A1 Feb. 14, 2002

Related U.S. Application Data

(62) Division of application No. 09/163,554, filed on Sep. 30, 1998, now Pat. No. 6,276,205.

(30) Foreign Application Priority Data

Sep. 12, 1998 (GB) .............................................. 9819821

(51) Int. Cl.$^7$ ......................... H01L 21/00; H01L 21/30; H01L 21/46; H01L 21/302
(52) U.S. Cl. ......................... 438/52; 438/458; 438/739
(58) Field of Search ............................. 438/50, 51, 52, 438/53, 458, 739

(56) References Cited

U.S. PATENT DOCUMENTS

| 4,968,628 A | | 11/1990 | Delgado et al. |
| 5,238,223 A | * | 8/1993 | Mettner et al. ............. 251/368 |
| 5,324,683 A | | 6/1994 | Fitch et al. |
| 5,415,726 A | | 5/1995 | Staller et al. |
| 5,511,428 A | | 4/1996 | Goldberg et al. |
| 5,616,523 A | | 4/1997 | Benz et al. |
| 5,656,512 A | * | 8/1997 | Beitman ....................... 438/52 |
| 5,682,053 A | * | 10/1997 | Wiszniewski ............... 257/401 |
| 5,756,901 A | | 5/1998 | Kurle et al. |
| 5,864,064 A | * | 1/1999 | Kano et al. ............. 73/514.66 |
| 6,048,774 A | * | 4/2000 | Yamamoto et al. ......... 438/406 |
| 6,122,090 A | * | 9/2000 | Kino et al. .................. 359/224 |
| 6,159,385 A | * | 12/2000 | Yao et al. ....................... 216/2 |

FOREIGN PATENT DOCUMENTS

| EP | 0 543 361 | 5/1993 |
| EP | 0 591 554 | 4/1994 |
| EP | 0 772 045 | 5/1997 |
| JP | 9-14570 | 6/1997 |

* cited by examiner

Primary Examiner—John F. Niebling
Assistant Examiner—Viktor Simkovic
(74) Attorney, Agent, or Firm—Nixon & Vanderhye P.C.

(57) ABSTRACT

A method of fabricating a micro-mechanical sensor (101) comprising the steps for forming an insulating layer (6) onto the surface of a first wafer (4) bonding a second wafer (2) to the insulating layer (6), patterning and subsequently etching either the first (4) or second wafer (6) such that channels (18,20) are created in either the first (2) or second (4) wafer terminating adjacent the insulating layer (6) and etching the insulating layer (6) to remove portions of the insulating layer (6) below the etched wafer such that those portions of the etched wafer below a predetermined cross section, suspended portions (22), become substantially freely suspended above the un-etched wafer. This method uses Silicon on Insulator technology. Also disclosed is a micro-mechanical gyroscope structure (101) allowing an anisotropic silicon to be used to fabricate a sensor functioning as if fabricated from isotropic silicon.

23 Claims, 9 Drawing Sheets

MICRO-MACHINING

This application is a division of application Ser. No. 09/163,554, filed Sep. 30, 1998, the entire content of which is hereby incorporated by reference in this application U.S. Pat. No. 6,276,205.

This invention relates to improvements in micromachining, perhaps in a particular example to improvements in manufacturing motion sensors.

It is known to produce micro-mechanical sensors using micro-machining techniques. In particular, GB 2 276 976 shows a particular method for the production of such a sensor wherein a silicon wafer has cavities formed into its surface. Next a second wafer is bonded to the surface of the first wafer and the second wafer etched in a manner to release portions of the second wafer which are above the cavities in the first wafer. Thus, suspended resonating portions are formed which exist above the cavities in the first wafer.

Further, WO 95/08775 shows a structure wherein a layer of silicon is formed onto a substrate. The silicon is etched in a manner to form suspended resonator portions above cavities in the silicon.

One such micro-mechanical sensor is the vibratory gyroscope which measures the rate of turn and has applications in the fields of vehicle control, smart munitions, robotics, virtual reality, leisure and medicine as well as other fields.

According to a first aspect of the invention there is provided a method of fabricating a micro-mechanical sensor comprising taking a first wafer with an insulating layer formed thereon and with a second insulating layer bonded to the insulating layer and a) patterning and subsequently etching one of either the first or second wafers such that channels are created in said one wafer (the etched wafer) terminating adjacent to the insulating layer; and b) etching the insulating layer to remove portions of the insulating layer adjacent the etched wafer such that those portions of the etched wafer below a predetermined size, suspended portions, become substantially freely suspended above the other wafer.

Preferably the method is used to fabricate micro mechanical sensors or micro mechanical actuators.

Such a method leaves portions of the etched wafer which are above the predetermined size attached to said other wafer through the insulating layer. Thus, the micromechanical sensor so formed comprises both suspended portions and also portions anchored to the other wafer by the insulating layer.

During an etch, etchants will generally etch any free surfaces of a target material which they contact. Therefore, if a volume of target material is exposed to an etchant it will be etched from each of the sides which the etchant contacts. The length of time it takes the etchant to completely remove the target material will depend upon the shortest distance from an edge portion of the volume to the centre of the volume. Thus a long thin shape will be remove before a square shape of equal volume. Thus, the predetermined size above which suspended portions become separated from the other wafer depends upon the dimensions of the volume of the insulating layer being etched.

Step b) of the process may be performed in a single pattern and etch step or may be as a series of pattern and etch steps.

The insulating layer may be thought of as a sacrificial layer and as an anchoring layer. However, the skilled person will appreciate that the insulating layer has insulating properties which may be utilised.

The method according to the first aspect of the invention is simpler to use that prior art methods. The resulting reduction in process complexity is an advantage over both sacrificial surface micro-machining (SSM) and traditional bulk micro-machining (TBM) technologies.

Further advantages of the method are that structures formed in the etched wafer can be made with a greater depth than in prior art methods using surface micromaching (SSM) wherein layers are deposited or other types of Silicon On Insulator processing. Typical depth limits for a deposited layer are between 10 $\mu$m–20 $\mu$m. It would not have been possible to reliably deposit material to the depth achieved by the present method. For instance providing material by deposition has the problem that the uniformity of the material is hard to control with errors of 5% across a wafer being typical. Further, the process provides a buried insulating layer.

Further, as the thickness of a deposited layer increases the internal stresses within the layer of deposited material increase and can eventually lead to the deposited layer delaminating itself from the material upon which the material was deposited. The present method may be used to fabricate structures having a depth of up to substantially 2 mm. Possibly this may be increased to 2.5 mm, 3 mm, 3.5 mm or 4 mm.

The skilled person will appreciate that it is beneficial to have deeper structures since they will be stiffer and will therefore have better mechanical properties. Further it is advantageous to have the structures fabricated from single crystal material rather than from deposited material since this also leads to many beneficial properties within the formed structures.

The skilled person will realise that wafers can be purchased which comply with the starting steps of the method; that is a sandwich structure of two wafers with an insulating layer provided between them. Therefore, the starting point in the process may be the commercially available sandwich structure. The method may however, include the steps of fabricating an insulating layer onto a first wafer and subsequently bonding the second wafer to the insulating layer.

Further it will also be appreciated that the cost of a wafer with silicon and insulating layers provided on the surface is higher than the cost of a wafer without the extra layers provided. The combined advantages of the invention may more than offset the higher cost of the wafer with the extra layers compared to a standard wafer.

The skilled person will appreciate that the gap between the suspended portions defined from said one layer and said other wafer is defined by the thickness of the insulating layer and therefore by controlling the thickness of the insulating layer between the first and second wafers this gap may be controlled. The thickness of the insulating layer may be substantially in the range 10 nm to 20 $\mu$m. More preferably the insulating layer has a thickness substantially in the range 100 nm to 10 $\mu$m. In the most preferred embodiments the thickness lies substantially in the range 1 $\mu$m to 5 $\mu$m. In particular, layer thickness of substantially 1.5 $\mu$m and 3 $\mu$m may be suitable.

Preferably the first wafer is a mechanical wafer which undergoes subsequent processing to have the structure formed therein. An advantage of forming the insulating layer on the mechanical wafer is that a cleaner interface is formed for subsequent processing (for example etching).

A further advantage of providing the first wafer as the mechanical wafer is that the devices subsequently formed from the mechanical wafer are formed from the single crystal structure of the wafer. As previously discussed this has advantages, namely it is likely that devices formed will have a higher reliability and that resonant devices formed will have a higher quality factor when compared to structures formed in polycrystalline materials of prior art methods. However, the single crystal of the wafer often shows anisotropic properties and considerations may arise which need to be considered in the design stage to account for the anisotropic nature. The anisotropic properties may depend on factors including crystal orientation of the material and the accuracy of any cut of the crystal.

Preferably the second wafer is a substrate or handle wafer which is provided as a support for the micro-mechanical sensor.

Of course, the first wafer may be a substrate or handle wafer and the second wafer may be a mechanical wafer which undergoes subsequent processing (for example etching). Such a structure is equally possible but the interface between the mechanical wafer and the insulating layer tends to be of poorer quality since this is where bonding occurs.

One company capable of providing a sandwich structure capable of being used for the start of the method is BCO Technologies (NI) Ltd., Belfast, BT11 8BU.

The method may comprise an additional step of polishing the wafer to be etched (which may be either the first or second wafer) to the desired thickness. This polishing may be performed as part of bonding the second wafer to the insulating layer or as an additional step before step a) of the method is performed. This has the advantage that the micro-mechanical sensor so formed by the method can be tailored to the correct thickness. The polishing may be performed by mechanical means (for instance grinding), or may be by chemical means (for instance etching) or may be by a combination of mechanical and chemical means (chemical-mechanical means).

An advantage of the present method is that the wafer being polished is supported over its entire area by a combination of the other wafer and the insulating layer. In some prior art methods a wafer which was not supported over its entire area was polished which in some instances led to buckling of the wafer over the unsupported areas.

During step a) of the method wet chemical etchants may be used to etch the channels into the etched wafer and isotropic or anisotropic profiles may be provided.

Alternatively, or additionally, dry etching may be used. Such etching is advantageous because it increases the aspect ratio of depth to width which can be achieved by using wet etching. Also, the minimum feature size may be reduced and density of features may be increased using dry etching. In particular, a deep dry etcher such as an advanced silicon etch (ASE) system produced by Surface Technology Systems using a fluorine based inductively coupled plasma may be used.

Further, the packing density may be increased by the use of dry etching over that for wet processes associated with TBM which may reduce unit costs.

Yet another advantage of using dry etching arises from the following. Since the aspect ratio of the etch is increased the depth of the micro-mechanical sensor may be increased over prior art structures. Therefore, the mass of portions below the predetermined cross sectional area which are substantially freed during step b) (the suspended portions) of the method may be increased over the masses of comparable structures formed by SSM techniques. An advantage of having higher masses for the suspended structures is that the sensor sensitivity is increased. The mass of the suspended structure may be increased by an order of magnitude when compared to structures provided the traditional SSM techniques.

Preferably the mask for the etch of step a) is optimised so that the areas to be etched have substantially equal cross sectional areas and pattern density. This may be important should a deep dry etcher be used; the rate of etch for such a system is dependent on cross sectional area and pattern density and therefore should regions having different cross sectional areas or pattern densities be used they will etch at different rates.

Preferably the method includes providing suspensory ligaments between the suspended portions and the remainder of the etched wafer. These suspensory ligaments have the advantage that when the suspended portions are released from the other wafer (by the removal of the insulating layer) they are maintained in situ by the suspensory ligament. The suspensory ligaments may comprise portions of the etched wafer which remain after the etching processes.

A further advantage of a high aspect ratio etching process for step a) of the method is that the stiffness of the suspensory ligament is increased in the vertical direction when compared to suspensory ligaments which would have been fabricated from prior art methods (there is now a greater height to width ratio when compared to prior art structures which had a much lower depth).

The higher stiffness for the suspensory ligament is advantageous in that for resonant sensors parasitic modes of oscillation may be reduced. That is if the sensor is stiffened in a z-axis direction of a Cartesian co-ordinate system cross talk to the x and y axis is reduced. Further, the higher stiffness may be advantageous in that the likelihood of the suspended portions sticking to the un-etched wafer are reduced.

The etchant used in step b) of the method may be a wet chemical etchant. Alternatively, or additionally, the etchant to be used in step b) may be a dry etchant such as a vapour or gaseous etchant or may be plasma or ion beam.

In some processes it may be desirable to use a vapour etchant for step b) of the method. When using wet etchants stiction problems may arise due to surface tension effects as the etchant dries causing the suspended portions to stick to the other wafer or to portions of the etched wafer above the predetermined cross sectional area. Residues may form as a result of the vapour etch phase (for example with HF gas), which may possibly be due to dopants (for example phosphorous) in the insulating layer.

The method may comprise the step of cleaning the etched areas of the insulating layer with another gaseous or vapour phase agent, for example steam to remove the residues. Stiction problems associated with having wet surfaces between the suspended portions and the remainder of the first and second wafers are therefore removed or lessened (that is the stiction problems associated with using a wet etchant).

The structure may be held at a temperature of greater than substantially the boiling point of the vapour being used whilst the cleaning is being performed. In the preferred embodiment the structure is held significantly above substantially 100° C. whilst cleaning is being performed. Possibly the structure is held at approximately 150° C. When as in the preferred embodiment the vapour used is steam this ensures that the steam does not condense wetting the surfaces and potentially causing stiction problems. In some embodiments steam used may be further superheated, possibly to approximately 200° C. or more.

It may be possible to refill (with a refill material) some of the channels created in the etched wafer prior to the performing of step b). This is advantageous in that it allows small features below the predetermined cross sectional area to be laterally anchored to features above the predetermined cross sectional area such that they are held in place once the sacrificial insulating layer between the mechanical and handle wafers is partially removed.

Should the channels be refilled, surface layers (for example metallisation) may be deposited upon, or laid across, the refilled channel. This has the advantage that the metallisation could reach electrically isolated parts which would otherwise be mechanically and electrically isolated by the channel.

The material used to refill the channels may be a nitride which is advantageous in that it may be deposited as a low stress layer on the surrounding wafer. Preferably the nitride is provided by PECVD. The nitride may be silicon nitride.

Of course, the skilled person will appreciate that the material used to refill the channel could be a material other than a nitride. Indeed, a polymer such as a polyimide, or may be a photoresist, would be a suitable refill material. A polyimide or photoresist is advantageous in situations where it is required to form electrical pathways over a channel. Once the electrical pathway has been created the method may comprise removing the refill material to re-create the channel. The polyimide may be PIQ™.

Alternatively, or additionally the channels may be refilled with polysilicon and/or an oxide of the material from which the wafer is fabricated (hereinafter referred to as an oxide) either of which may be deposited by processes such as TEOS or PECVD.

The refill material may contain voids. The skilled person will appreciate that the quality of the refill material does not necessarily have to be high.

Buried or covered contacts may be provided in the insulating layer as it is formed onto the surface of the first wafer. The contacts buried in the insulating layer may be formed from at least any one of the following materials: polysilicon, silicides. Of course, the skilled person will realise that any other conductor could be used if it is capable of withstanding the temperatures involved in the bonding process.

The skilled person will appreciate that electrical connections may necessarily be made which bridge suspended portions. In such circumstances provision needs to be made for the connections before or after step b) of the process is performed. Such connections could possibly be made by our co-pending application entitled "Improvements relating to micro-machining" and filed on the same day as this application.

Preferably the first and second wafers are provided from a semi-conductor. Most preferably, the first and second wafers are provided from silicon.

Preferably the method is fully compatible with CMOS processing. The method may comprise providing integrated circuits in association with the sensor such that a sensor is provided in a single package with the necessary processing electronics.

The insulating layer between the first and second wafers may comprise more than one material. The different materials may be laid down in layers. In one embodiment there are provided two materials in three layers. In another embodiment there are provided three materials in four layers.

Should different materials be used to form the insulating layer, each, or some of, the materials may have a different etch rate.

The materials forming the insulating layer may be an oxide. Further, the materials forming the insulating layer may be doped or undoped oxides. Preferably, there is provided at least one layer of undoped oxide and at least one layer of doped oxide. In the most preferred embodiment there are provided two layers of undoped oxide sandwiching a layer of doped oxide. In the most preferred embodiment there may or may not be provided a layer of nitride in the insulating layer.

In other embodiments the insulating layer may be formed from at least one layer of nitride. Such a nitride layer may be doped or undoped. There may be provided at least one doped layer of nitride and at least one layer of undoped nitride. Indeed, there may be provided two layers of doped nitride sandwiching a layer of undoped nitride.

In yet another embodiment the insulating layer may be polymer based, possibly a polyimide. There may be provided an insulating layer which is a sandwich structure of any of the following: conducting layers, insulating layers, semiconducting layers, polymer layers.

Providing the insulating layer in a plurality of layers is advantageous because it can aid the release of the suspended portions from the remaining portions. As the skilled person will appreciate a doped oxide will etch faster than an undoped oxide. Therefore by providing a layer of doped oxide between two layers of undoped oxide the middle, doped oxide, layer will etch faster. By controlling the time period of the etch of the insulating layer it is possible to stop the etch once all of the middle doped oxide layer has been removed but with portions of the undoped oxide remaining. The portions of undoped oxide will tend to prevent stiction between the suspended portions and the remaining portions. That is the portions of undoped oxide remaining may help to prevent stick down (due to surface tension effects) after the freeing process. The remaining portions of undoped oxide may be thought of as a series of bumps which reduce the contact surface area.

Further, it is advantageous to provide the insulating layer by a deposition process (which may be PECVD) since deposited layer will grow faster than thermally grown layers. Also, the PECVD process can be tailored so that either compressive of tensile stresses are left in the deposited layer. Therefore, should a plurality of layers be deposited the method may include the steps of depositing the insulating layer such that a compressive layer is followed by a tensile layer (or visa versa) such that there is substantially zero stress in the combined layers. Of course, as discussed hereinbefore, there may be more than two layers deposited.

By choosing the material of the layers within the insulating layer it may be possible to eliminate strain between the first and second wafer; that is for the strain imparted on the various layers to cancel out so that there is zero net imparted to the wafers.

The portions of undoped oxide remaining may be at a centre region of the suspended portions or may be between channels formed through the suspended portions (which may be thought of as access holes).

A further advantage of having the doped layer bounded by the undoped layers is that the undoped layers may act as a barrier to the prevent the dopants migrating into the wafers during bonding of the second wafer to the insulating layer should the undoped layer have a great enough thickness.

Nitride and oxide layers typically have a lower stiction coefficient than silicon layers and therefore the inclusion of such a layer can also allow the suspended portions to be released more easily. Further, nitride layers are insulators and will not be etched by the same wet etchant used to remove any oxide layer which has been provided if the etchant is selective. Therefore, should a nitride layer be provided it will remain in place during any etch of an oxide layer provided within the insulating layer. Thus, once substantially freed, the suspended portions of the etched wafer will be electrically insulated from the unetched wafer should the suspended portion ever contact the unetched wafer due to the nitride layer even though other layers of the insulating layer have been substantially removed.

Preferably any layers provided within the insulating layer are formed using Plasma Enhanced Chemical Vapour Deposition (PECVD). As discussed hereinbefore such layers etch faster than layers provided by other techniques. Also, because PECVD processes occur at relatively low temperatures when compared to other processes there are likely to be lower stresses within the insulating layer. In particular, the insulating layer may be provided by the use of PECVD followed by an anneal step. The anneal step is advantageous because it may improve the yield of the method. Indeed in some embodiments a rapid thermal anneal may be used wherein the insulating layer is exposed to a high temperature for a short period of time.

An advantage of using deposited layers (as opposed to thermally grown layers) is that the deposited layers etch faster, possibly two orders of magnitude quicker than thermally grown layers.

Further, it may be preferred to incorporate dopants into the deposited layers since these will cause the deposited layers to reflow at lower temperatures and may increase etch rates further still. Suitable dopants for incorporation into the deposited layers may include any from the following list (but is not limited to this list): Phosphorous, Boron, Antimony, Arsenic, Germanium.

Using the annealing process it is possible to bond the second wafer to an oxide deposited fabrication of the insulating layer which has been deposited in a LPCVD (Low Temperature Oxide) process. Deposited layers tend to etch faster than thermally grown layers and it may therefore be preferred to provide the insulating layer by a deposition process (such as PECVD or LPCVD) rather than by thermal growth.

The skilled person will appreciate that the thickness of the wafer etched in step b). Will define the thickness of elements of the sensor formed by the method. The thickness of the etched wafer, at the start of step b), may lie substantially in the range 1 μm to 1 mm. More preferably the thickness of the etched wafer at the start of process d) lies substantially in the range 10 μm to 200 μm.

The method may produce elements of the sensor which are thinner than the surrounding wafer by locally thinning the wafer, for example using an etching process.

According to a second aspect of the invention there is provided a micro mechanical device fabricated according to the method of the first aspect of the invention.

The sensor may any one of the following: gyroscope, accelerometer, resonating beam, or any other resonant or micro-mechanical sensor. It may also be possible to fabricate an actuator or a combination of a sensor and actuator (for example a micro robot capable of measuring and interacting with its environment). The device may incorporate a resonator.

According to a third aspect of the invention there is provided a method of fabricating a micro-mechanical sensor comprising the following steps:

a) forming an insulating layer onto a top most surface of a first wafer;

b) etching portions of the insulating layer;

c) bonding a second wafer to the insulating layer; and d) etching a bottom most surface of one of the wafers, the etched wafer, adjacent the etched portions of the insulating layer such that portions of the etched wafer become substantially free (suspended portions) from the remainder of the first and second wafers.

No etching step to remove portions of the insulating layer after the second wafer has been bonded are required in this method and therefore problems associated with stiction of the suspended portions to the remainder of the wafers are avoided.

Preferably it is the first wafer which has its bottom most surface etched. This is advantageous because of the cleaner interface between the first wafer and the insulating layer (because the insulating layer was formed upon the first wafer).

The method may comprise a step before step a) wherein marker channels, having a top end portion near to a top surface of the wafer and a bottom end portion distal from the top end portion, preferably substantially perpendicular to the surface of the wafer, are etched into the first wafer. These marker channels may have a depth substantially equal to the depth of the wafer through which they have been fabricated. These marker channels are advantageous as they can act as alignment markers for the remainder of the process and may align features from the back of the wafer to the front of the wafer. Indeed, the features so aligned may be buried on the back of the wafer.

In addition to fabricating marker channels before step a) other portions of the wafer may be removed by patterning and etching. This may allow portions of the wafer to be thinned (that is have their depth reduced) when followed by etching from the front of the wafer. One possible use of such a thinning would be to allow the sensitive axis of the device being fabricated to be out of the plane of the wafer.

As discussed hereinbefore if a portion has a large stiffness in a first direction along the z axis of a Cartesian co-ordinate system cross talk to the x and y axis will be reduced. Therefore, by reducing the stiffness in the z axis the sensitivity of the device can be tailored in the x and y axial directions. The method may comprise tailoring the sensitivity as desired.

Preferably the insulating layer formed during step a) of the process fills any channels formed in the first wafer.

The method may comprise another step, between steps c) and d), wherein the first wafer is polished to the desired thickness. The polishing may be mechanical (perhaps using a diamond paste), or may be chemical, or may be a combination of mechanical and chemical etching may be chemical-mechanical. The skilled person will appreciate that should the first wafer be polished it is the bottom most surface, that is the surface without the insulating layer, which is polished.

In the preferred embodiment polishing of the wafer removes the first wafer such that the bottom end portions of the marker channels are revealed. This is advantageous because the marker channels are now visible at the bottom most surface of the wafer. The skilled person will appreciate that after step c) of the method the top most surface of the first wafer is covered by both the insulating layer and the second wafer attached to the insulating layer and that therefore, the channels (acting as alignment markers) etched into the first wafer are covered. By forming the channels to a depth equal to or greater than the depth of the sensor it is possible to make the channels visible once more during the polishing process such that the channels can be used to align the etching process of step d).

As with the method of the first aspect of the invention Silicon On Insulator (SOI) wafers could be obtained prefabricated and therefore steps a) and b) of the process could be pre-formed.

The method may comprise a further step between steps b) and c) wherein the portions of the insulating layer which have been etched are refilled with a filler material. The filler material may be a material which has an etch rate substantially equal to that of the wafer material during step d) of the method. The filler material may be substantially the same material as the wafer (for example if the wafer is silicon the filler material may be polysilicon). Alternatively, the filler material may be a conductive material, for example a silicide, or TiW. Preferably the etching of step d) is arranged to be coincident with the refilled etched portions in the insulating layer.

It is known that during certain high aspect ratio etches through a wafer in an SOI structure that when an etch over runs the wafer through which the etch is passing may be damaged (for example by doming) as the etch meets the insulating layer. This occurs as the etch reaches the insulating layer. The low etch rate combined with charging effects means that ions at the junction of the materials may cause doming. If the filler material is of the same material as the wafer it will be etched as if part of the main wafer and so little or no doming may occur. Also, if the filler material is a conductor the charge on the ions can be carried away by the conductor thus also reducing the problem by reducing charging effects which accelerate the ions toward side walls. Therefore, an advantage of having a portion of the insulating layer removed and refilled is that if an etch, as described herein, is allowed to over run it may simply etch the refill material as opposed to damaging the wafer.

According to a fourth aspect of the invention there is provided a method of forming an alignment marker comprising the following steps:

a) forming channels into a top-most surface of a wafer substantially perpendicular to the surface of the wafer, the channels having a top-most end portion adjacent the top-most surface of the wafer and a bottom end most portion distal the top-most end portion;

b) providing a layer onto the surface of the wafer which fills the channels;

c) polishing the wafer from a rear-most surface at least until the bottom end portion of the channel is exposed through the rear-most surface of the wafer.

Polishing the rear-most surface of the wafer may occur until the channel is exposed through the rear-most surface of the wafer. Alternatively polishing may occur until the channel is visible using infra-red imaging through the rear-most surface of the wafer.

This method is advantageous in that initial processing can be performed on the top-most surface of the wafer and subsequent processing can be carried out on the rear-most surface of the wafer with the processing steps on the opposite sides of the wafer being aligned by the use of the alignment markers passing through the wafer.

The layer provided on the surface of the wafer may be an oxide (or may be a nitride) which may be provided by Plasma Enhance Chemical Vapour Deposition (PECVD). Of course, the skilled person will realise that by the use of known micro-machining techniques many other layers could be provided. Further, the layers could be provided by many deposition techniques other than PECVD. A polyimide or photoresist may also be used.

According to a fifth aspect of the invention there is provided a method of separating portions of at least two wafers comprising the following steps:

a) providing two wafers separated by an insulating layer wherein the insulating layer is fabricated from at least two sub layers of material having different etching rates;

b) etching the insulating layer to remove portions of that insulating layer wherein the time of the etch is controlled to ensure that at least one sub layer is substantially completely removed within the portion being etched and at least one other sub layer is partially left un-etched in the portion being removed.

This method is advantageous in that it can reduce problems encountered with stiction between the two wafers which can arise during removal of the insulating layer.

The portion of the sub layer which is left un-etched may be arranged to have a small cross sectional area when compared to the area covered by the portion of the insulating layer being removed. Perhaps the un-etched portion is less than substantially 10%, perhaps less than substantially 5% of the portion being etched. As the skilled person will appreciate stiction is a function of the cross sectional area and therefore if the area is significantly reduced then the amount of stiction experienced between the two wafers will also be significantly reduced.

According to a sixth aspect of the invention there is provided a method of separating a first portion of material from a second portion of material comprising using a dry etching process to etch between the portions and subsequently using a dry agent to clean any residues remaining from the etch.

The first portion and the second portion may be the same material or they may be different materials. Indeed, the dry etch may be used to etch a material which is different from both of the first portion and the second portion. Indeed, such a process may be used to etch an insulating layer from between two wafers as described herein.

Prior art techniques of separating portions of two adjacent portions have encountered problems where the portions stick to one another due to stiction and surface tension caused by liquids left between the two portions by the fabricating processes. Clearly, by using a dry agent there will be no liquid between the portions and therefore the stiction and surface tension problems should be overcome.

The dry process may use HF gas. Plasma etching techniques may also be employed should the selectivity of the etch between the first and second portions and the material being etched be sufficiently high. If the method is applied to the silicon on insulator technology according to the first aspect of the invention there would need to be a sufficiently high selectivity between the silicon and the insulator. If the selectivity is not high enough the silicon may also be etched reducing the performance of any device fabricated from the wafers.

Preferably the dry cleaning agent is steam but any other suitable agent to remove the residues may be used. The steam may be super-heated. Of course, the dry agent may be the gaseous/vapour phase of any liquid and may be thought of as an agent wherein there is never any liquid present.

Preferably the portions of material are held at a temperature above the boiling point of the agent to be used. This ensures that as the agent is used to clean the wafers no drops of the liquid phase condense or are left on the portions of material.

According to a seventh aspect of the invention there is provided a micro-mechanical ring gyroscope having a ring element which is fabricated from a material having anisotropic properties, the dimensions of at least a portion of the element being thicker or thinner when compared to the remainder of the element so that the gyroscope functions as if it were manufactured from a material having isotropic properties.

This has the advantage that material showing imperfect properties can be used to fabricate the gyroscope and yet the gyroscope will still function accurately. Such gyroscopes have a number of applications including: vehicle control, smart munitions, robotics, virtual reality and medicine.

Preferably the gyroscope is fabricated from silicon with the lattice spacing of substantially <100> as the plane of the silicon wafer. It is known that within <100> silicon the modulus of rigidity and the radial Young's modulus vary significantly in a cos 4θ manner (where θ is an angle within a plane in the silicon from a reference point on that plane).

Previously micro-mechanical gyroscopes have been fabricated from silicon wafers with substantially <111> as the plane of the wafer. In such <111> oriented silicon the radial Young's modulus varies little with angular orientation. As the skilled person will appreciate <111> silicon is much more expensive than <100> silicon and it is therefore advantageous to be able to use <100> silicon. However, until the realisation of this invention it was not possible to use <100> silicon without employing tuning methods (for example laser trimming) because the anisotropic nature of the material led to inaccurate performance of the gyroscope. Using <100> silicon materials may also make integration of on chip electronics simpler.

Preferably the gyroscope has a number of sensing elements. The sensing elements may be equispaced around a circle. There may be eight sensing elements. Alternatively there may be 16, 32, 64 or 128 sensing elements.

The gyroscope may be fabricated from a ring supported by suspension elements/ligaments with at least eight sensing elements which may be arranged at 45° intervals around a circle. If such a gyroscope (having drive and sense modes) were fabricated from <100> silicon with all of the sensing elements of equal dimensions the effect of the anisotropy would be to cause a split in the frequencies of the drive and sense modes. This split is significant and causes a reduction in gyroscope sensitivity as the modes do not efficiently couple under an applied rate of turn and high levels of mechanical coupling swamp the sense signal. It may be desired to thicken a sensing element substnatially in the range 0.1 μm to 50 μm when compared to the unthickened sensing element.

One embodiment of this would be to thicken portions of the ring associated with alternative sensing elements when compared to the remaining portions of the ring (as if in a cos 4θ).

Although the required thickening of the elements will vary according to the dimensions of the wafer and size of device. For a 100 μm thick ring the portion of increased thickness may be thickened when compared to the remaining portions of the ring by substantially 13 μm. However, this thickening is merely an indication since the precise increase needs to be calculated for each particular design. Other stages may be thickened to account for anisotropy in <100> silicon. It may be desired to thicken a sensing element substnatially in the range 0.1 μm to 50 μm when compared to the unthickened sensing element.

According to an eighth aspect of the invention there is provided a method of fabricating a micro-mechanical ring gyroscope according to the seventh aspect of the invention which uses the method of the first aspect of the invention.

Fabricating a gyroscope according to this method is advantageous in that the process is CMOS compatible allowing integrated packages (including both the sensor and the electronics) or indeed fully integrated devices to be fabricated.

The method may comprise providing substantially all of the necessary sensors and processing electronics in a single package or may comprise providing a sensor in a first package and substantially all of the required processing circuitry in a second or multiple packages.

The skilled person will appreciate that the gyroscope is a micro-mechanical sensor.

The method may comprise determining the degree of misalignment of the crystal lattice before fabricating the gyroscope. For example X-ray photo spectroscopy (XPS) may be used. Further, once the degree of misalignment has been calculated the method may comprise calculating the degree of change required in the thickness dimension to compensate for the misalignment of the crystal lattice.

The method may comprise the step of etching an alignment marker using an etch having anisotropic properties dependent upon crystal planes into the wafer prior to fabrication of the gyroscope in order to determine the orientation of the crystal planes. The etch may be a wet etch.

The method may also comprise calculating the necessary alterations to the dimensions of the gyroscope in order to allow for the mis-alignment of the crystal planes from the optimum orientation. Alternatively, or additionally, a mask used to fabricate the gyroscope may be aligned with the alignment markers fabricated on to the wafer by the anisotropic etch rather than with the wafer flats. In yet another embodiment once the degree of misalignment has been determined the misalignment could be allowed for in the completed gyroscope. For instance the gyroscope may be trimmed, or may be actively tuned.

According to a ninth aspect of the invention there is provided a micro-inertial mechanical sensor having at least one element which is fabricated from a material having anisotropic properties, the dimensions of the element having the thickness dimension designed so that the sensor functions as if it were manufactured from a material having isotropic properties.

The micro-inertial sensor may be a gyroscope.

There now follows by way of example only a detailed description of the invention with reference to the accompanying drawings of which:

FIG. 1 shows a cross section through two silicon wafers separated by a plurality of insulating layers;

FIGS. 2a to c shows stages in the production of a micro-mechanical sensor according to the invention;

Figure 1:
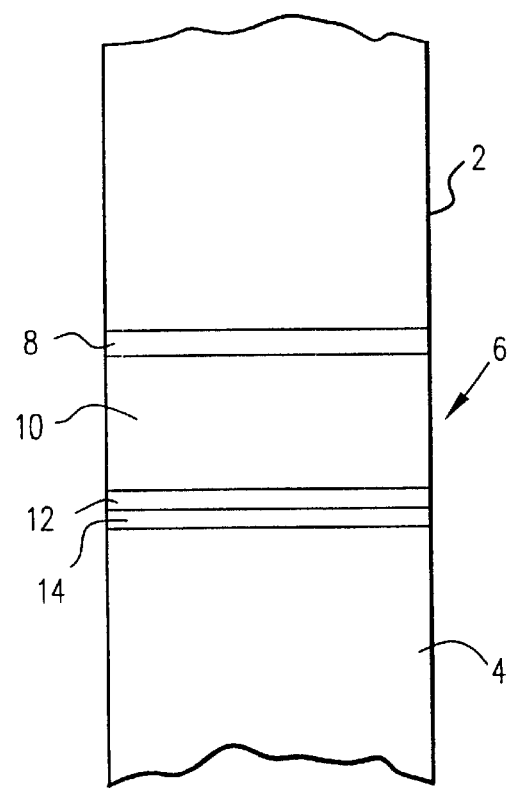

The materials cross sectioned in FIG. 1 are suitable for fabricating the micro-inertial mechanical sensors of this invention.

Two silicon wafers 2, 4 are separated by an insulating layer 6 which itself comprises a number of layers 8, 10, 12, 14. The topmost layer 8 is a layer of undoped PECVD silicon oxide having a thickness of substantially 0.2 μm. The layer 10 is PECVD silicon dioxide doped with phosphorous having a thickness of substantially 2.6 $\mu$m. The layer 12 is similar to the topmost layer 8 and is 0.2 $\mu$m thick PECVD silicon oxide. The bottom most layer 14 is a 0.1 $\mu$m thick layer of undoped PECVD silicon nitride. It should be noted that this structure is not essential to performing the invention.

Possible dopants for the doped layer include: phosphorous, boron, antimony, arsenic, germanium. Although other dopants are equally possible.

As discussed above the insulating layers are provided by PECVD onto a standard silicon wafer. Once the insulating layers have been fabricated the wafer is annealed to prepare the insulating layer for bonding. The presence of the undoped layers 8, 12 between the doped layer 10 and the silicon wafers 2, 4 ensures that the dopants present in the doped layer 10 do not migrate into the silicon wafers 2, 4.

Although for the embodiment described PECVD has been used to form the oxide 8, 10, 12 and nitride 14 layers other deposition/growth processes could be used.

The layers 8, 10, 12, 14 are deposited onto the mechanical wafer 2 and the handle wafer 4 is bonded to the layer 14. The deposited layers provide a better interface with the wafer than the bonded interface and it is therefore preferred to have the better interface next to the mechanical wafer 2. It would however, also be possible to deposit (or grow) the layers 8, 10, 12, 14 onto the handle wafer 4 and bond the mechanical wafer 2 onto the layer 8.

The topmost wafer (or mechanical wafer) can be polished to the desired thickness. This is initially performed by mechanical grinding and finished with chemical mechanical polishing (CMP) to ensure a good surface finish.

Thus, the silicon wafers are of such a thickness to give the desired properties in the fabricated micro-inertial mechanical sensor. In this embodiment the top silicon wafer 2 is 100 $\mu$m and the bottom silicon (or handling) wafer 4 is 500 $\mu$m. However, the process has been performed with the mechanical wafer 2 having a thickness of between 15 $\mu$m and 100 $\mu$m.

Figure 2A:
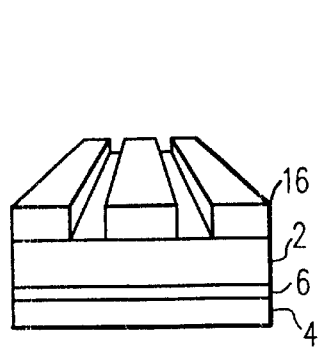
Figure 2B:
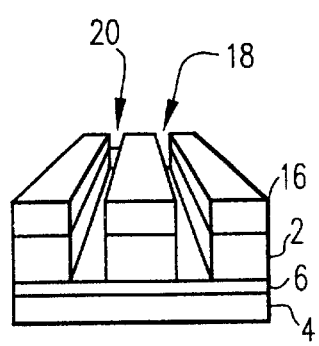
Figure 2C:
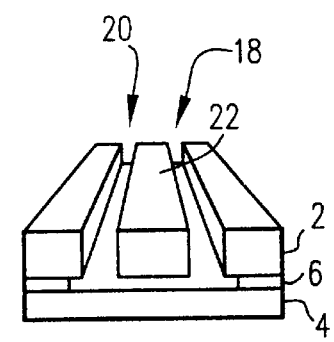

The process of making the micro-inertial mechanical sensor is outlined in FIGS. 2a to 2c. The first stage in the process (not shown in FIG. 2) is to employ a masking layer 16 onto the exposed surface of the mechanical silicon wafer 2.

Next, the masking layer 16 is patterned and etched using standard techniques leaving parts of the mechanical silicon wafer 2 exposed as shown in FIG. 2a. A dry etch of the top-most silicon wafer 2 is performed using the Advanced Silicon Etch (ASE) system provided by STS which uses a fluorine-based inductively coupled plasma. As will be appreciated other deep trench etching systems could also be used. The etch effectively stops at the insulating layer 6 due to the high etch selectivity between silicon and silicon dioxide. This is as shown in FIG. 2b which shows that two channels 18, 20 have been formed into the mechanical silicon wafer 2. The skilled person will appreciate that the channels are mere representations of the actual etching which would occur in the production of a micro-inertial mechanical sensor.

Next, once the masking layer has been removed a wet etch (or possibly a vapour etch or possibly dry etching) is used to remove the masking layer 16 and portions of the insulating layer 6. Etching of the insulating layer 6 as a whole is uniform (although etching within the layer is not as will be discussed hereinafter) so that portions of the mechanical silicon wafer 2 above a predetermined cross section remain anchored to the handling silicon wafer 4 by the insulating layer 6. Portions of the mechanical silicon wafer 2 below the predetermined cross section have the insulating layer 6 completely removed from between that portion and the handling silicon wafer 4. Thus, the portions of mechanical Silicon wafer 2 (such as that shown at 22 in FIG. 2c) become free of the handling silicon wafer 4 (suspended portions).

Thus, the insulating layer acts both as an anchor layer bonding the two wafers 2, 4 together and also as a sacrificial layer. Also, it will be seen that the thickness of the insulating layer 6 determines the gap between the suspended portions 22 and the handling wafer 4. The process has been used with an insulating layer 6 of between 1.5 $\mu$m and 3.0 $\mu$m, although it may be applied with layer thickness' of between 10 $\mu$m and 100 $\mu$m.

A further advantage of using a PECVD grown layers over those discussed above is that they etch faster than thermally grown oxides which is beneficial for the etch of the insulating layer 6 to release the suspended portions 22.

If etching is done in two stages as described hereinbefore it would be possible to laterally anchor small features such as portion 22 to large features (which are still anchored to the bottom most silicon wafer 4 via the insulating layer 6) by refilling the channels 18, 20 with a dielectric or other material that would not be removed in the etch which removes the insulating layer 6. If this were done small structures such as portion 22 would remain anchored even if they are subsequently completely under cut and substantially freed during etching of the insulating layer 6.

Refilling of the channels would also allow surface metallisation to be provided from small features such as portion 22, across the refilled channel to the portions which are still anchored to the handle silicon wafer 4. This would allow drive electrodes to be provided to areas otherwise mechanically isolated by the channels.

Should it be desired contacts (perhaps, polysilicon, silicides, or other conductive layers capable of withstanding temperatures in the bonding process) could be incorporated into the insulating layer 6, for example using planarising technologies.

Figure 3A:
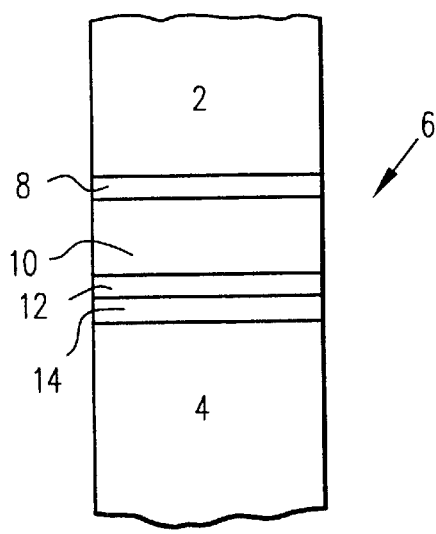
FIG. 3 shows the principle involved in reducing the stiction between two wafers.
Figure 3B:
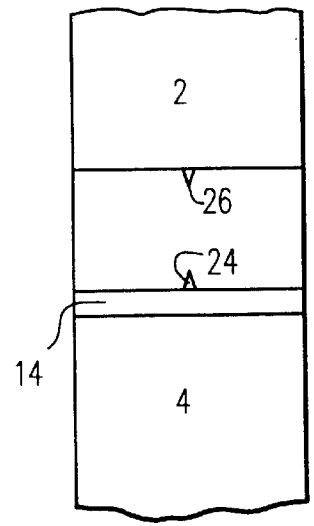

FIG. 3 shows in more detail how the etching process to remove the insulating layer 6 proceeds. As will be appreciated FIG. 3a is the same as FIG. 1 and shows a cross section through the wafers before etching has begun. As the skilled person will appreciate the etch rate for the doped oxide 10 is higher than that for the undoped oxide layers 8, 12. Therefore the material of the doped oxide layer 10 will be removed faster than that of the undoped oxide layers 8, 12. It is possible to time the etch so that it is stopped once all of the doped oxide 10 layer has been removed but with some of the undoped layers 8,12 remaining as protrusions 24, 26 (as shown in FIG. 3b).

The etchant used to remove the oxide layers 8, 10, 12 does not remove the nitride layer 14. The nitride layer 14 therefore remains covering the handling wafer 4 which is advantageous for two distinct reasons. Firstly, the nitride layer is an insulator and will thus prevent short circuits between the mechanical 2 and handling 4 wafers should they come into contact. Secondly, the nitride layer 14 has a lower stiction coefficient than silicon (that is the nitride will help to prevent stiction) and hence will aid the release of the suspended portions from the handling wafer 4.

The protrusions 24, 26 help to alleviate problems of the suspended portions 22 sticking to the handling silicon wafer 4. Stiction problems associated with the wet etchant may cause the suspended portions to stick to the handling wafer. The protrusions 24, 26 provide areas with a low surface area which are less prone to stiction problems. Thus, the provision of the protrusions 24, 26 can aid the release of the suspended portions from the handling silicon wafer 4.

A further way of reducing stiction problems between the suspended portions and the handling wafer 4 would be to use an all dry process. For example an HF vapour etch may be used followed by cleaning with superheated steam.

To achieve this the wafers are heated to above the boiling point of water to ensure that the steam cannot condense on the wafers. This is especially advantageous should dry etches be used to remove the insulating layer 6 in which case there would be no liquids used in the process to cause stiction problems.

The deep dry etch utilised to fabricate the channels 18, 20 has some properties which need to be taken into account to fabricate the sensor correctly. Firstly, narrow features etch more slowly than wide features and regions of high pattern density etch more slowly than regions with a low pattern density due to the effects of Reactive Ion Etching (RIE). This property can be overcome or alleviated in the design process wherein channels to be etched are designed to have substantially the same width and the exposed silicon area is minimised.

Should different width channels be used, wide channels would etch faster. The deep dry etcher does not etch through the insulating layer 6 due to the high selectivity of etch rates between the silicon and the insulating layer; once the channel being etched reaches this depth it effectively stops. As the narrow channels are still being etched the etching process continues and because the wide channels cannot get any deeper they may suffer doming at a bottom most portion of the channel in the vicinity of the insulating layer 6. This problem is associated with charging from the plasma and excess fluorine at the interface. The doming can damage portions of the sensor. The problem may be reduced by using less aggressive etches and suitable geometries.

Secondly in prior art methods it is hard to precisely and correctly control the thickness of mechanical layer across its full width. There can be process variations in the formation of the layers to be etched (in SSM techniques) of up to 10% across the width of the wafer. Thus, subsequent etches need to overrun to account for this variation in which case doming can occur at the bottom most portions of the channels being etched wherein silicon is removed in substantially perpendicularly from the original etch direction. This variation in the layer thickness is in addition to any non-uniformity in the etching process itself which may also lead to doming, etc.

An advantage of using the methods of the present invention is that it has a good uniformity in the process for thinning of the wafer. Using SOI technology the wafer can typically be thinned to within 1 $\mu$m (or 1% on a wafer of 100 $\mu$m thickness) accuracy across the wafer. The increased accuracy in the thinning the wafer can lead to less problems with over etching and consequent doming.

Figure 4A:
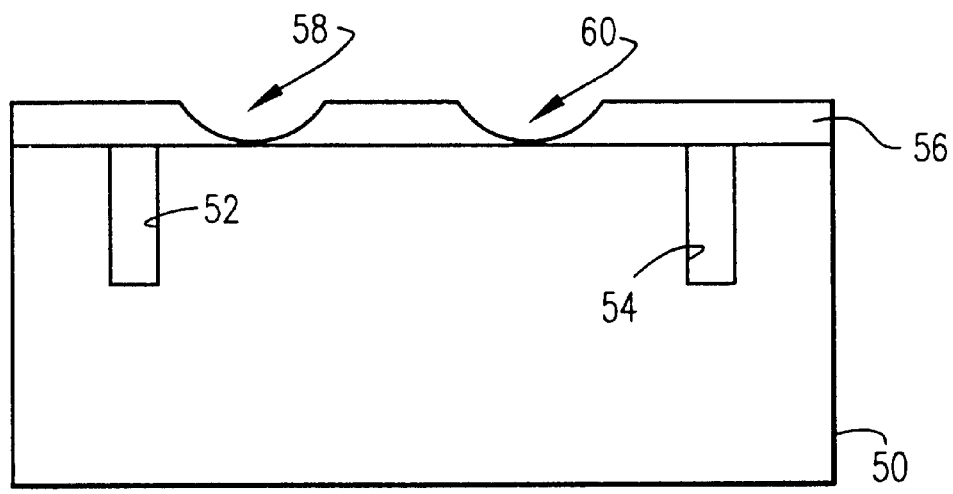
FIG. 4 shows the stages in a different process to that shown in FIG. 2 of the production of a micro-mechanical sensor.
Figure 4B:
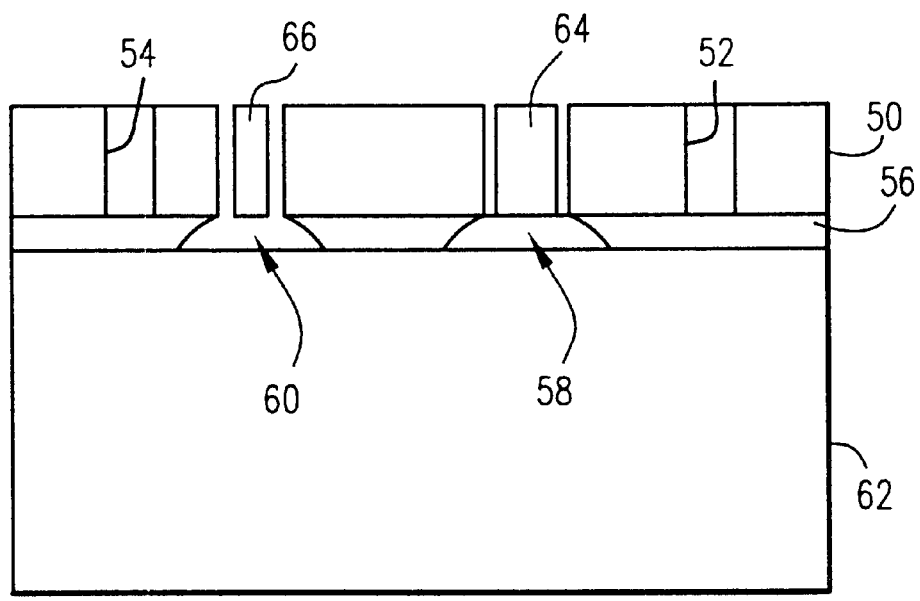

An alternative process of making the sensor is shown in FIG. 4 which may help to overcome some of the problems associated with the etch process. A standard silicon wafer 50 (mechanical wafer) has a masking layer provided on a topmost surface and is patterned using standard techniques. Using the patterned mask two channels 52, 54 are etched into the wafer using an advanced silicon etch to a depth substantially equal to or significantly more than 100% of the desired thickness of the sensor (e.g. substantially 110% of the desired final thickness of the sensor). The patterned mask is then removed.

An insulating layer 56 is grown using PECVD (or other technique) onto the topmost surface of the mechanical wafer 50 such that the channels 52, 54 are also filled with the insulating layer or other suitable refill material. As will be appreciated the multi layer insulating layer described in relation to FIGS. 1 to 3 could also be used here. Polysilicon could also be used to refill the markers.

Next the insulating later 56 is patterned and etched using the channels 52, 54 as alignment markers. The mask used to pattern the dielectric may be the same mask as that which would be used to define the mechanical structure in the final silicon etch or may be specifically designed mask. A wet chemical etchant would generally be used for good selectivity. The etching process removes portions 58, 60 of the insulating layer 56 which will be associated with suspended portions in the final sensor structure.

Next a handle wafer 62 is bonded to the insulating layer so that a sandwich structure is formed with the insulating layer 56 between two silicon wafers as in a typical SOI structure.

Once the handling wafer 62 has been bonded the structure turned over, that is rotated 180°, about its horizontal axis and subsequent processing is performed on the mechanical wafer 50 (now the top-most wafer).

The mechanical wafer 50 is then polished to the desired thickness using mechanical polishing and grinding initially followed by chemical-mechanical polishing to provide a good surface finish. At the beginning of the process the channels 52 and 54 were etched into the wafer to a thickness of 110% of the desired thickness of the sensor (that is the thickness of the mechanical wafer after etching). Thus, the polishing removes roughly 10% of the channel. It will be realised that the channels 52, 54 now pass entirely through the wafer 50 and are filled with dielectric or other suitable materials. In some embodiments the channels may also be left unfilled. The portions of the channels 52, 54 visible on the topmost surface of the mechanical wafer 50 can be used as alignment markers for subsequent processing. The skilled person will appreciate that the processes carried out on either side of the wafer 50 will be aligned with each other.

Once the polishing process has finished the topmost surface of the mechanical wafer 50 is patterned and etched using a deep dry etcher. The etch takes place above the portions of removed insulating layer 56. As the etch passes through the mechanical wafer 50 suspended portions 64, 66 are formed; these portions not being connected by the insulating layer 56 to the handling wafer 62.

This alternative process flow for the forming of a sensor may be advantageous in that the etch through the silicon does not have be timed according to the depth of the mechanical wafer 50. The etch will now finish in a void and therefore problems of over etching and subsequent doming are removed.

The voids may be linked to the edge of the wafer or to a larger area that will etch through first. In such a case any residual pressure trapped during the bonding process will be released prior to the etch breaking through to the voids. This overcomes a potential problem with releasing devices within a low pressure environment, such as debris being disbursed when an area under higher pressure is linked to an area under lower pressure by a thin membrane.

Further, the alternative process flow may be beneficial in that it only involves dry etches being short, simple processes and avoids the use of wet etches which tend to cause problems relating to stiction of the suspended portions.

FIG. 5 shows an alternative process flow for the fabrication of a micro-mechanical sensor wherein an insulating layer is provided and an insulating layer 149 is provided on top of a mechanical wafer 150. In the embodiment shown the insulating layer is an oxide which has been grown on to a silicon wafer. This is shown in FIG. 5*a*.

Figure 5A:
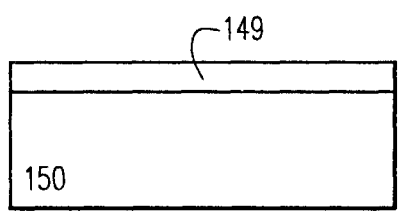
FIG. 5 shows a schematic for a further process flow for the production of a micro-mechanical sensor.
Figure 5B:
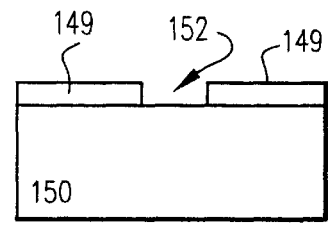

Next, as shown in FIG. 5b the insulating layer 149 is patterned and etched using standard techniques so that a portion of the insulating layer is removed creating a void 152.

Figure 5D:
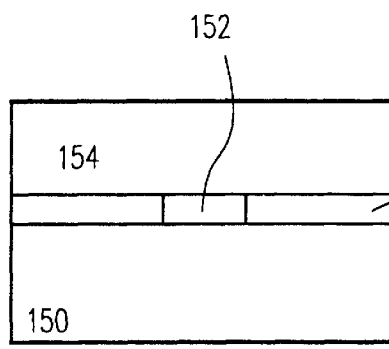
Figure 5C:
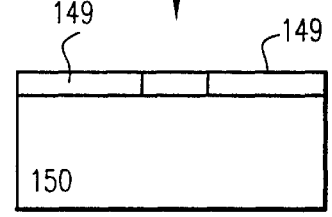
Figure 5E:
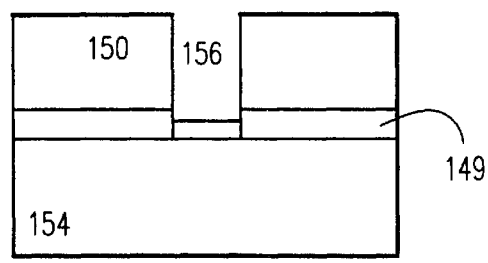

As shown in FIG. 5c the void 152 is refilled using a material which is readily etched by a deep dry etch, or other high aspect ratio etch which will subsequently be used to etch silicon. In this case the void was refilled with polysilicon.

A second wafer 154 is then bonded, using known techniques, to the insulating layer 149 forming the standard silicon on insulator (SOI) sandwich. As can be seen in FIG. 5d the refilled void 152 is sandwiched between the two wafers 150, 154.

The sandwich is then flipped so that etching can be performed on the mechanical wafer. As discussed earlier it is preferred to etch the wafer on which the insulating layer was grown due to the cleaner interface between the insulating layer 149 and the wafer 150 as opposed to between the wafer 154 to which the insulating layer 149 was bonded.

As in previous embodiments the top wafer is ground/polished to the desired thickness and then patterned and etched. The etching is again performed by a high aspect ratio process, in this case ASE by STS was used to form the channel 156. It should be noted that as in FIG. 5e the channel 156 in the mechanical wafer 150 is aligned with the void 152 created in the insulating layer 149.

As discussed hereinbefore due to process variations it is difficult to precisely time the etch so that it stops at the boundary between the mechanical wafer 150 and the insulating later 149. If the etch is allowed to over-run then doming of the silicon wafer 150 is likely to occur in regions of the channel 156 neighbouring the insulating layer 149. However, the provision of the filled void 152 over comes this problem. It will be appreciated that the doming occurs due to the preferential etching of silicon compared to the etch rate of the insulating layer 149 and charging at the oxide interface. The polysilicon filled void 152 has been arranged to be coincident with the channel 156 so that if the etch over-runs it will etch the polysilicon which etches at the same rate as the silicon wafer 150 and is conducting. Thus the doming problem is alleviated.

It will be appreciated that although in the above discussion of FIG. 5 the wafer upon which the insulating layer 149 was formed was thought of as the mechanical wafer it would also be possible to form the devices in the wafer 154 bonded to the insulating layer (that is treat the wafer 154 as the mechanical wafer).

Alignment markers passing substantially through the mechanical wafer, as described herein, may be used for this method to ensure that the masks used to etch the mechanical are aligned with the voids 152 created in the insulating layer 149. Indeed, the same mask may be used to etch the mechanical wafer and the insulating layer 149 and the alignment marker may be used to ensure that this mask is correctly orientated before the etch is performed on the mechanical wafer.

It will be appreciated that should the alignment marker not pass entirely through the wafer it may still be possible to align a process on one side of the wafer with a process on the opposite side of the wafer. An alignment marker only passing partially through the wafer may be visible using infra red imaging from the side of the wafer on which the alignment marker is not present. Such imaging is commonly available in fabrication plants. Prior art techniques of fabricating alignment markers would not have been visible using infra red imaging.

The above methods are used to fabricate a micro-inertial mechanical sensor which in particular may be a ring gyroscope fabricated from silicon. A scanning electron micrograph of such a device 101 is shown in FIG. 5 and a cross section through line AA of FIG. 6 is shown in FIG. 7.

Figure 6:
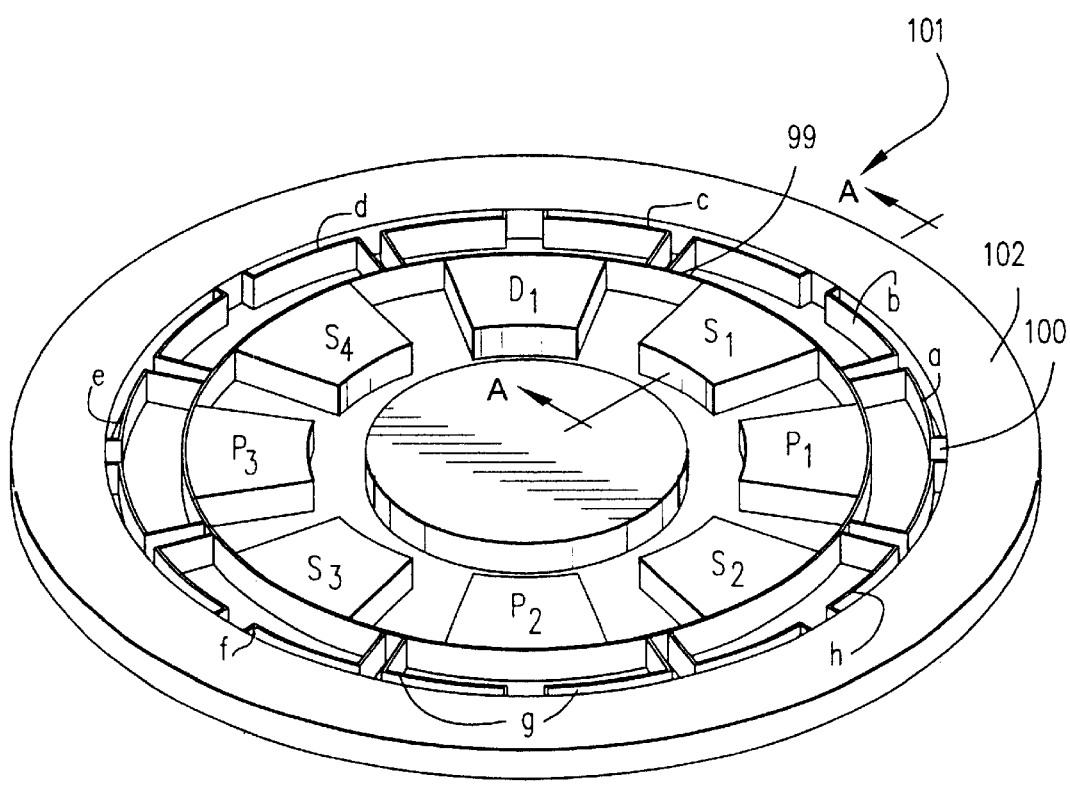
FIG. 6 shows a scanning electron microscope picture of a micro-mechanical sensor formed according to the present invention.
Figure 7:
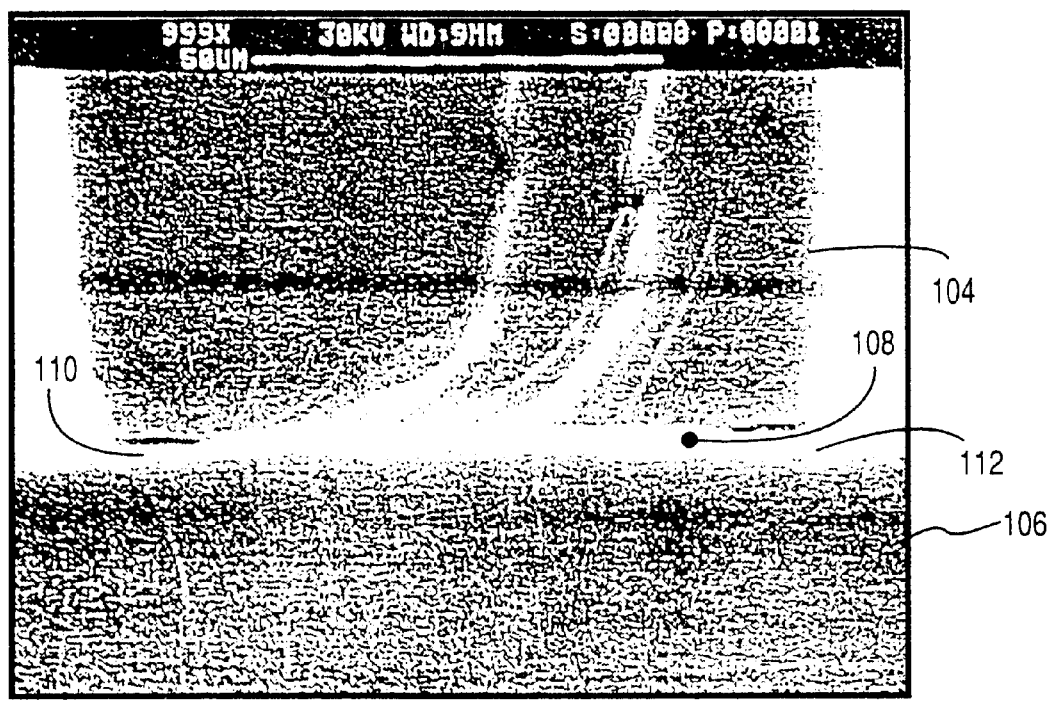
FIG. 7 shows a scanning electron microscope picture of a feature of the sensor of FIG. 6.

The gyroscope shown in FIG. 6 comprises a single ring 99 supported by eight suspensory ligament pairs (a to h) centred at 45° intervals around the ring 99. The ring 99 comprises a suspended portion which has been etched from a wafer 102. The ligament pairs (a to h) are connected to the ring 99 and connect it to the wafer 102.

In the example shown in FIG. 6 eight electrode elements ($D_1$, $P_{1,2,3,4}$ and $S_{1,2,3}$) are provided, equi-spaced, around the inside of the ring 99. Each of the electrode elements forms the plate of a single capacitor, with the ring 99 forming the other plate. That is the plate 99 forms one of the plates of each of eight capacitors, with the other plate being formed by an electrode element.

The electrode element $D_1$ is used to drive the ring. A voltage is applied across the capacitor formed by $D_1$ to cause the ring 99 to oscillate. The capacitors formed with the electrode elements $P_{1,2,3}$ are used to sense the primary motion of the ring and the capacitors formed with the electrode elements $S_{1,2,3,4}$ are used to sense the secondary motion of the ring 99. The drive element $D_1$ can also be used to sense the primary motion of the ring 99.

Figure 9A:
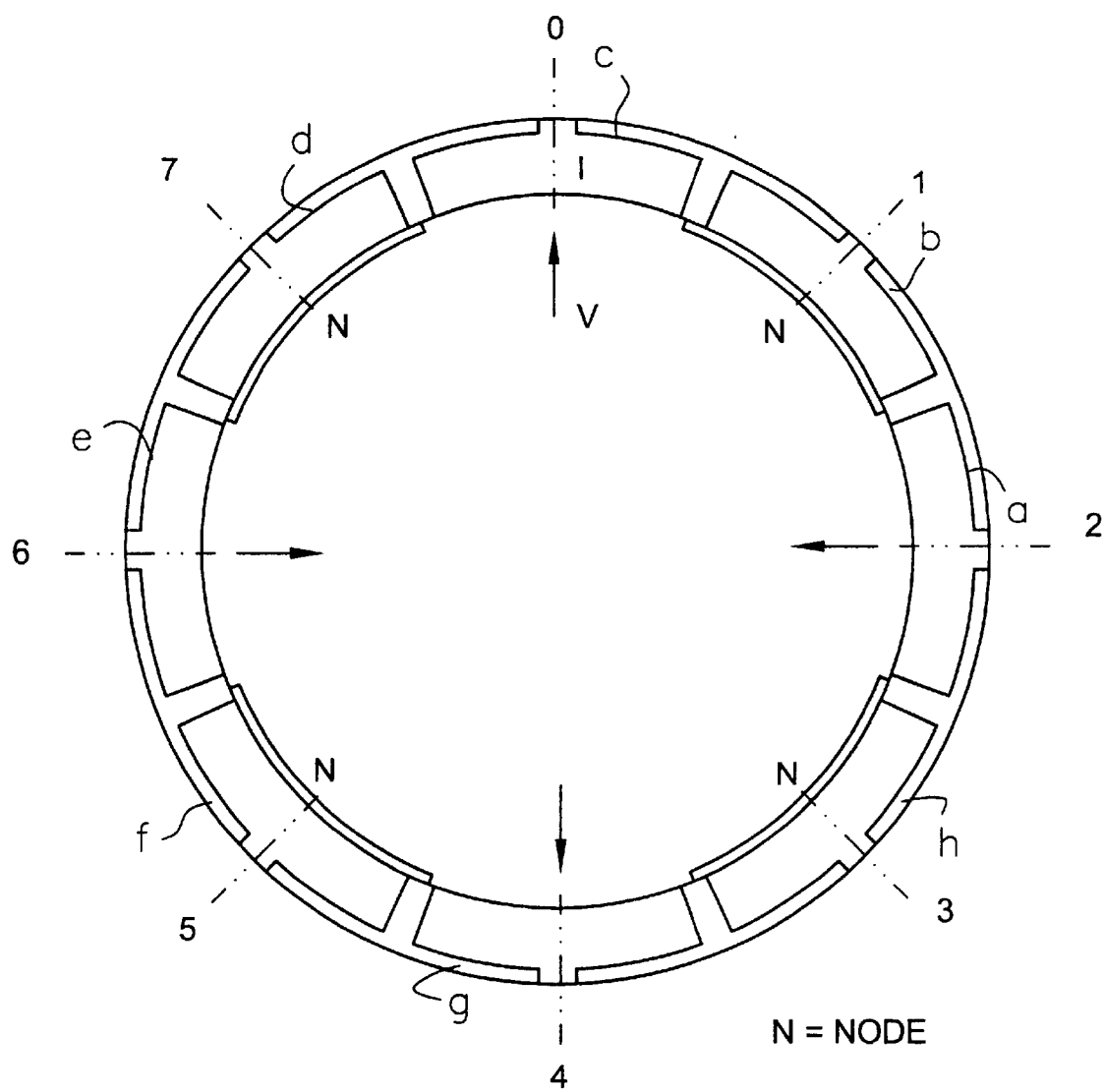
FIGS. 9a and 9b show the primary and secondary modes of vibration of the gyroscope of FIG. 8 respectively.

The skilled person will appreciate that the primary mode of oscillation of the ring will have four points of zero displacement around the ring 99 (which are marked with N in FIG. 9a). The zero points are arranged to occur at where the electrode elements $S_{1,2,3,4}$ are situated so that the capacitors formed by these electrode elements only pick up secondary motion. Also, the secondary mode of oscillation of the ring has four points of zero displacement around the ring 99 (marked with N and shown in FIG. 9b) and the electrode elements are arranged so the capacitors formed by $P_{1,2,3}$ and $D_1$ only pick up primary motion of the ring 99.

Figure 8:
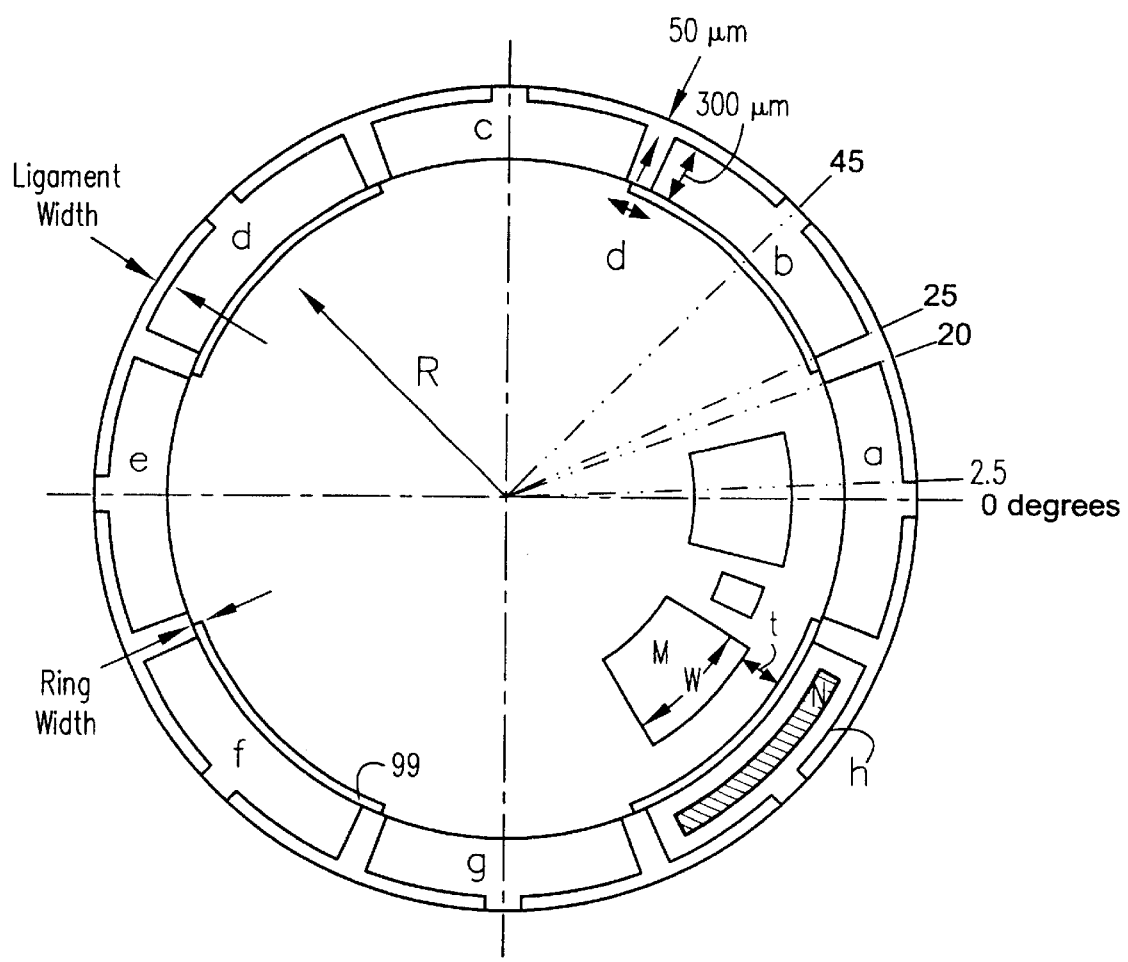
FIG. 8 shows a schematic structure of a gyroscope according to the present invention.

The skilled person will appreciate that the electrode elements could also be situated outside the ring 99 possibly within the supporting ligaments as shown at position N in FIG. 8. Further, extra electrode elements could be provided which may act as tuning capacitors. Such tuning capacitors may be provided at positions intermediate to the electrode elements $D_1$, $P_{1,2,3}$, $S_{1,2,3,4}$ such as that shown at L in FIG. 8.

Looking at FIG. 8 the skilled person will appreciate that the capacitance produced by the electrode element M will be given by:

$$C = \frac{EA}{t} \approx \frac{Ewh}{t}$$

In FIG. 7 a portion of the mechanical wafer 104, a portion of the handling wafer 106 and of the insulating layer 108 are clearly visible. It should be noted that edge regions of the portion of the mechanical wafer 104 there are voids 110, 112 where the insulating layer 108 has been removed during the etching process to substantially free the ring 99.

The gyroscope has been formed from silicon having an orientation of <100>. As the skilled person will know such silicon has anisotropic properties and the modulus of rigidity and the radial Young's modulus varying significantly in a COS 4θ manner through the material. This variation in mechanical properties has important implications for the fabrication of the sensor. The gyroscope has also been fabricated from silicon having an orientation of <111>.

To compensate for anisotropic material properties portions of the ring 99 in the regions of the suspensory ligaments (b, d, f, h) are thickened in comparison to portions of the ring in the region of drive/sense ligaments (a, c, e, g). Each of the thickened regions of the ring 99 each extends for a 45° arc around the ring 99 and can be seen in FIGS. 8 and 9. The 45° arcs of thickening are an approximation to a COS 4θ variation. The skilled person will appreciate that an actual COS 4θ variation could be employed.

The portions of the ring 99 in the regions of suspensory ligaments (b, d, f, h) are thickened relative to the remainder of the ring 99 by an amount h. The ring 99 in this example has a base width x of 100 μm and calculations have shown that the ideal thickening would be 13 μm i.e. h is 13 μm. This is most clearly seen in FIG. 10. This thickening compensates for the anisotropic properties and allows the gyroscope to function as if were fabricated from <111> silicon which has isotropic properties, or at least more like a <111> silicon sensor.

Generally before fabrication of the gyroscope was initiated x-ray techniques would be used to identify the exact crystal orientation of the wafer which was to be used to fabricate the gyroscope. Once the crystal orientation had been established the exact thickness adjustment required to overcome the misalignment of the crystal could be calculated and appropriate changes made to the mask or trimming techniques could be used to compensate for the misalignment once the gyroscope were fabricated. Such steps would allow the performance of the gyroscope to be tuned precisely to the particular wafer. The skilled person will appreciate it is difficult to cut a silicon crystal with precisely defined crystal orientation and that there will generally always be some error.

In some embodiments active tuning could be used to compensate for misalignment of the gyroscope relative to the crystal planes.

It would also be possible to determine the orientation of the crystal planes within the wafer by etching appropriate alignment markers onto the wafer using an anisotropic wet etch which would self align to the crystal planes of the wafer. The subsequent masks could then be aligned to the alignment markers rather than to flats on the wafer. The skilled person would know the approximate alignment of the planes within the wafer. For instance they may know that wafers are typically specified to ±2°. The use of anisotropically wet etched markers would allow the actual alignment to be determined. Therefore, a single mask would be provided for the gyroscope and this would be aligned correctly by way of the anisotropically etched alignment markers.

An advantage of the use of anisotropically etched alignment markers is that a plurality of wafers may be etched in a single process and the pattern self-aligns to each wafer.

The gyroscope described herein is fabricated from silicon using processes which are compatible with CMOS processing technology which offers a low cost gyroscope. The gyroscope may be provided with on chip processing circuits which may be fabricated within a CMOS facility, or other integrated micro-electronic fabrication facility. The skilled person will appreciate that CMOS processes are typically carried out on <100> orientated silicon wafers, although it is possible to make them on <111> orientated silicon at significant expense.

Vibratory gyroscopes operate by exciting a vibratory primary motion in the structure which experiences a Coriolis force under an applied rate of turn. This force produces a secondary motion the amplitude of which is a measure of the rate of turn. In most devices the primary and secondary motions correspond to two modes of vibration of the structure.

In addition to the general requirement that the fabrication process be CMOS compatible the following additional requirements were identified as possibly being important in order to achieve high sensitivity small low cost devices:

a. To achieve a high response by frequency matching of the primary and secondary modes of vibration.

b. The frequency of the primary and secondary modes of vibration should be high to reduce device size and to reduce the effect of environmental noise but low to reduce capacitive coupling. It should remain below approximately 100 kHz as to allow standard linear analogue circuit techniques to be used.

c. To employ designs which allow differential detection of the primary and secondary motions as this offers the possibility of reducing common mode signals.

d. To employ designs which offer the possibility for nulling the secondary motion so as to offer linear operation over a wider dynamic range.

e. To use standard materials such as <100> silicon.

Figure 9B:
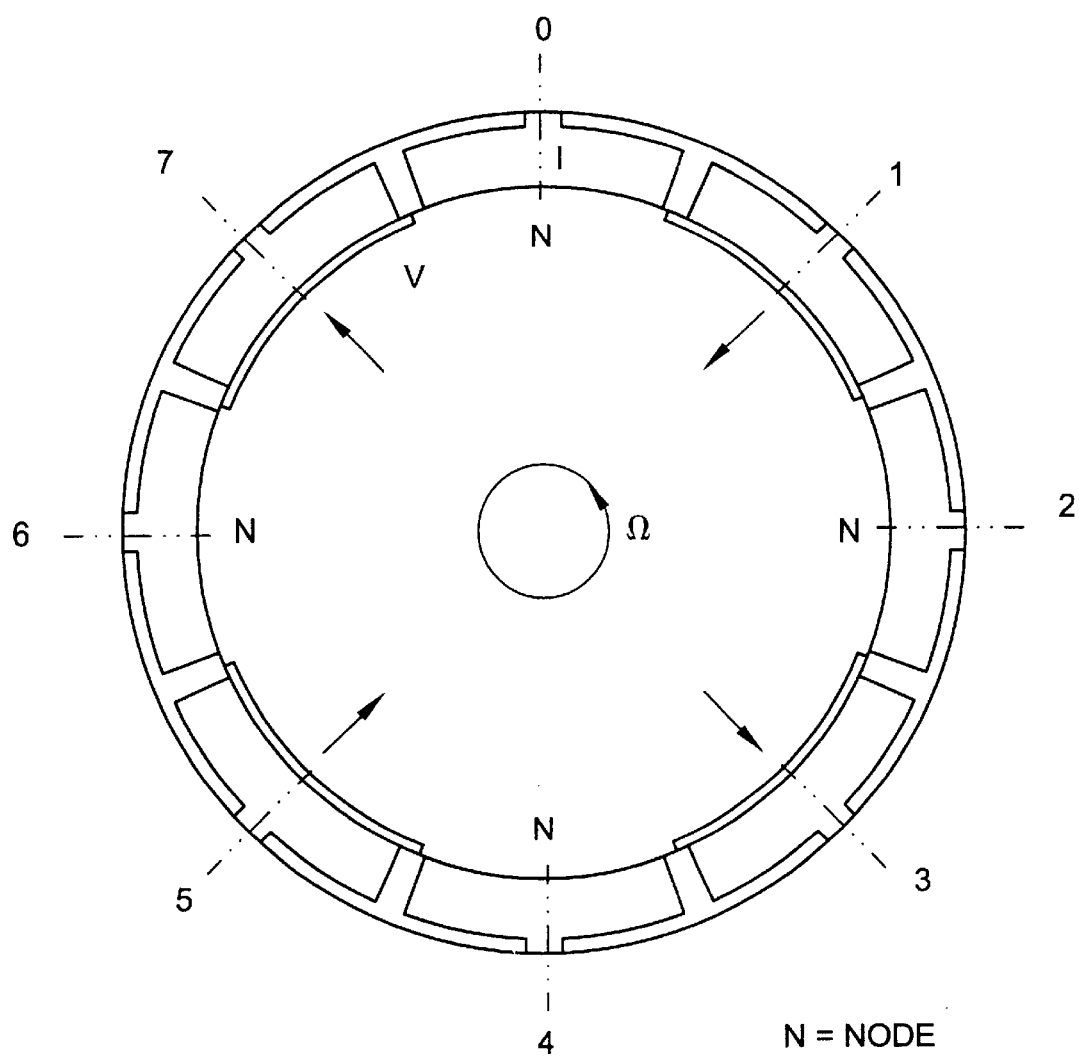

A gyro structure that may meet these requirements takes the form of a ring 99 that vibrates in the plane of the wafer, shown in FIG. 8. The desired primary and secondary modes of vibration of the gyroscope are as shown in FIGS. 9a and 9b, respectively. The ring 99 is held in place by eight supporting ligament pairs 100. The ring 99 and its ligaments are etched from <100> mechanical silicon wafer. A ring fabricated from crystalline silicon will be expected to have predictable material properties, high intrinsic Q, and the thickness required for mechanical stability. These requirements are not reliably obtained with layers deposited on to a silicon wafer.

It is desirable to make the ring the dominant dynamic element by making the ring width (5 μm–1 mm) greater than the width of the supporting ligaments 100 (1 μm to 0.5 mm). With the aim of operating in the desired frequency range a ring radius of 0.25 to 10 mm was chosen and to achieve mechanical stability a ring thickness x of greater than 1 μm is possibly required.

The skilled person will appreciate that a variety of different designs of gyroscope exist other than the one described herein including other transduction techniques. For instance it may be possible to measure the resistance change using the piezo resistive nature of silicon in elements to measure the motion of the ring. It may also be possible to use inductive detectors to measure the motion of the ring perhaps by applying tracking to portions of the ring and applying a magnetic field.

Figure 10:
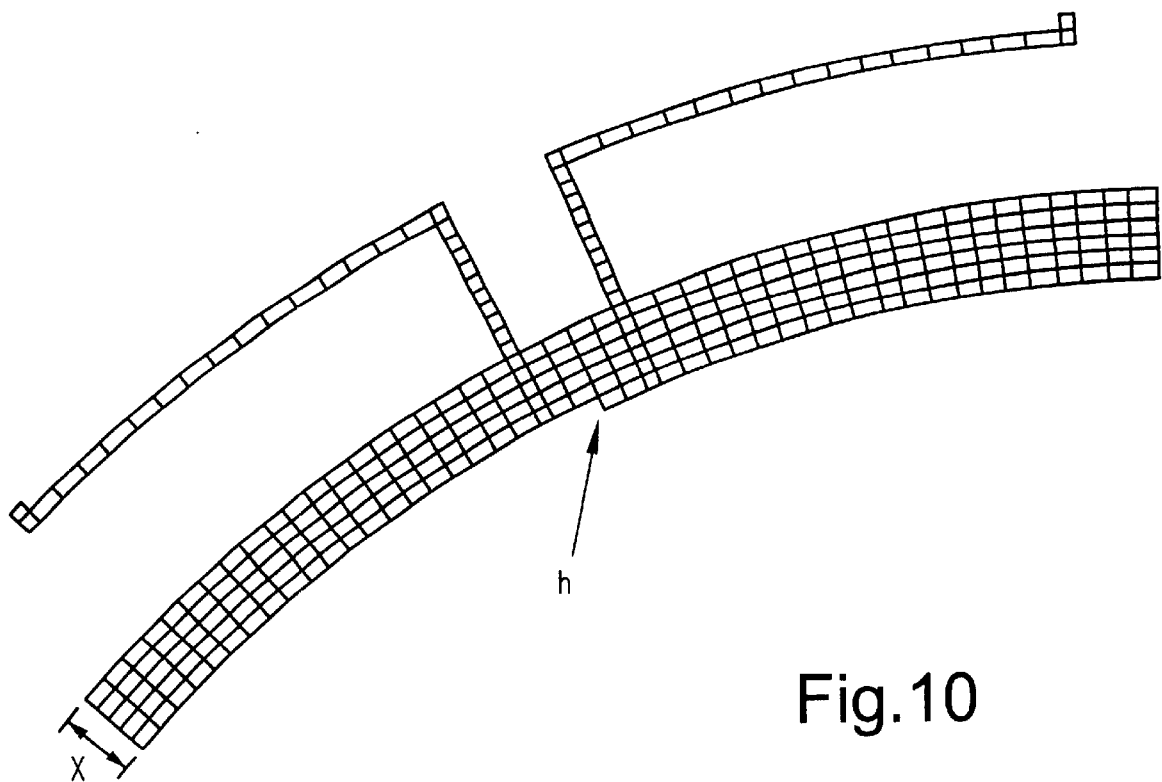
FIG. 10 shows a portion of ring of the gyroscope and its support ligaments of FIG. 8.

A silicon crystal is physically and mechanically anisotropic and its radial and tangential elastic stiffness coefficients vary in a cos 4θ manner around the ring. For a perfectly formed circular ring the effect of the anisotropy is to cause a split in the frequencies of the drive and sense modes. This split is significant and unless it is compensated for causes a reduction in gyro sensitivity. The effects of this anisotropy can be eliminated or substantially reduced by making the width of the ring different (by an amount h as discussed hereinbefore) in those regions associated with the drive and sense ligaments of the drive mode. FIG. 10 shows the details of the proposed construction and a value of h about 13 μm is required to match the frequencies for a ring thickness of nominally 100 μm.

What is claimed is:

1. A method of fabricating a micro-mechanical sensor comprising taking a first wafer with an insulating layer formed thereon and with a second wafer bonded to the insulating layer and (a) patterning and subsequently etching one of either said first or second wafers such that channels are created in said etched wafer terminating adjacent to said insulating layer; and (b) etching said insulating layer to remove portions of said insulating layer adjacent said etched wafer such that those portions of said etched wafer below a predetermined size become substantially freely suspended above the other wafer wherein said insulating layer between said first and said second wafers comprises at least one layer of undoped oxide and at least one layer of doped oxide.

2. A method according to claim 1 wherein the thickness of said insulating layer is substantially in the range 10 nm to 100 μm.

3. A method according to claim 1 wherein said second wafer is a substrate or handle wafer which is provided as a support for the micro-mechanical sensor.

4. A method according to claim 1 wherein the method comprises an additional step before step (a) of polishing said wafer to be etched (which may be either said first or second wafer) to the desired thickness.

5. A method according to claim 1 wherein a mask for the etch of step (a) is optimised so that areas to be etched have substantially equal cross sectional area.

6. A method according to claim 1 wherein suspensory ligaments are provided to join said suspended portions and a remainder of said etched wafer.

7. A method according to claim 1 wherein the method includes the step of cleaning the etch of said insulating layer with a vapour.

8. A method according to claim 7 wherein the structure being fabricated is held above substantially the boiling point of said vapour.

9. A method of fabricating a micro-mechanical sensor comprising taking a first wafer with an insulating layer formed thereon and with a second wafer bonded to the insulating layer and (a) patterning and subsequently etching one of either said first or second wafers such that channels are created in said etched wafer terminating adjacent to said insulating layer; and (b) etching said insulating layer to remove portions of said insulating layer adjacent said etched wafer such that those portions of said etched wafer below a predetermined size become substantially freely suspended above the other wafer wherein some of the channels created in said etched wafer prior to the performing of step (b) are refilled with a refill material.

10. A method according to claim 9 wherein surface layers are laid across said refilled channel.

11. A method according to claim 1 wherein said first and second wafers are provided from a semi-conductor.

12. A method according to claim 1 which comprises providing integrated circuits in association with said sensor such that a sensor is provided on a single wafer with the necessary signal processing electronics.

13. A method according to claim 1 wherein there are provided two layers of undoped oxide sandwiching a layer of doped oxide.

14. A method according to claim 1 wherein dopants are included in the layer of doped oxide and include any one from the following list consisting of: Phosphorous, Boron, Antimony, Arsenic, Germanium.

15. A method of fabricating a micro-mechanical sensor comprising taking a first wafer with an insulating layer formed thereon and with a second wafer bonded to the insulating layer and (a) patterning and subsequently etching one of either said first or second wafers such that channels are created in said etched wafer terminating adjacent to said insulating layer; and (b) etching said insulating layer to remove portions of said insulating layer adjacent said etched wafer such that those portions of said etched wafer below a predetermined size become substantially freely suspended above the other wafer wherein stress between the first and second wafer is reduced by providing said insulating layer as a series of at least three layers.

16. A method according to claim 15 wherein at least one of said at least three layers comprises an undoped oxide.

17. A method according to claim 15 wherein at least one of said at least three layers comprises a doped oxide.

18. A method according to claim 15 wherein at least one of said at least three layers comprises a nitride.

19. A method according to claim 15 wherein said series of at least three layers are deposited on said first wafer by the steps of depositing a compressive layer followed by a tensile layer.

20. A method according to claim 15 wherein said series of at least three layers are deposited on said first wafer by the steps of depositing a tensile layer followed by a compressive layer.

21. A method according to claim 1 wherein said insulating layer additionally comprises at least one Nitride layer.

22. A method according to claim 1 wherein the etch step (b) is timed such that some of said at least one undoped oxide layer remains as a protrusion.

23. A methods according to claim 1 wherein said insulating layer is provided by a deposition process.

* * * * *